L. BERGERON.
SLEIGH.
APPLICATION FILED FEB. 24, 1920.

1,353,141.

Patented Sept. 21, 1920.

Inventor
L. Bergeron
By
Attorney

UNITED STATES PATENT OFFICE.

LINDOR BERGERON, OF MACAMIC, QUEBEC, CANADA.

SLEIGH.

1,353,141.  Specification of Letters Patent.  Patented Sept. 21, 1920.

Application filed February 24, 1920. Serial No. 360,989.

*To all whom it may concern:*

Be it known that I, LINDOR BERGERON, British subject, farmer, residing at Macamic, in the Province of Quebec, in the Dominion of Canada, have invented certain new and useful Improvements in Sleighs; and I do hereby declare that the following is a full, clear, and exact description of the same.

The present invention relates to improvements in sleighs and its main object is to provide means whereby the runners of a sleigh are spring-held to absorb the shocks and roughness of the roadway.

To better understand the present invention, reference may be had to the accompanying drawings which form part of this application.

Like numerals of reference indicate corresponding parts in each figure.

In the drawings:—

Figure 1:
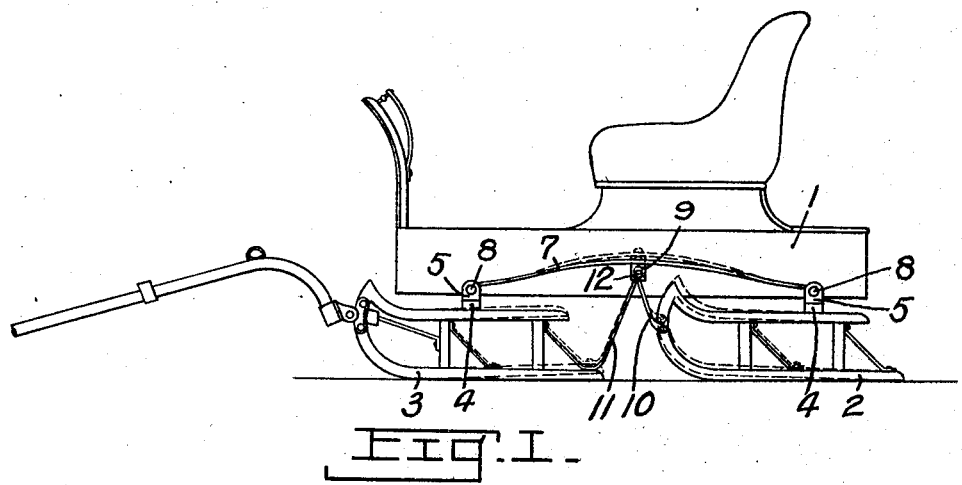
Figure 1 is a side elevation of a sleigh, of the four runner type, to which is adapted the invention.
Figure 2:
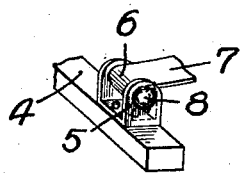
Fig. 2 is an enlarged perspective detailed view of the attachment of the spring.
Figure 3:
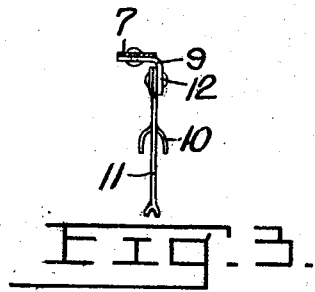
Fig. 3 is an enlarged detailed view of the connecting rods between the runners and the spring and means of securing the same.

1 is the body of a sleigh under which are pivotally mounted the runners 2 and 3 on the axle 4.

On each side of the body of said sleigh, rigidly secured to the axle 4, are U-shaped brackets 5 adapted to receive the looped-ends 6 of the flat preferably curved spring 7. The looped-ends 6 of the said spring are pivotally mounted on the bolts 8 which project through the brackets 5.

Intermediate of said spring 7 is a downwardly projecting lug 9, 10 and 11 are connecting rods pivotally mounted at one end to a bolt 12 secured to said lug 9, said rod 10 being rigidly mounted to the fore end of the runner 2 and the rod 11 being rigidly secured to the rear end of the runner 3.

It will readily be seen from the foregoing description that the runners, when contacting with a boss on the road, are caused to pivot on the axle 4, then, imparting a slight motion to the spring 7, as indicated in dotted lines in Fig. 1 of the drawings, the said spring 7 absorbing the shocks. Thus, riding in a sleigh provided with this shock absorber will be very smooth and naturally pleasant.

What I claim as my invention is:—

1. In combination with the front and rear runners of a sleigh pivotally mounted on axles; a resilient member secured to said front and rear axles; a member secured intermediate of said resilient member and secured to said runners whereby said runners will be oscillated simultaneously, substantially as described.

2. In combination with the front and rear runners of a sleigh pivotally mounted on axles; a resilient member secured to said front and rear axles; a lug secured intermediate of said resilient member; a member adapted to connect said front runners to said resilient member; and a member adapted to connect said rear runner to said resilient member, substantially as described.

3. In combination with the front and rear runners of a sleigh pivotally mounted on axles; two resilient members secured, in longitudinal arrangement in relation to said runners, to said axles; a downward depending lug secured intermediate of each of said resilient members; and connecting members pivotally secured to the fore ends of said rear runners and rigidly secured to the rear ends of said front runners, said connecting members being pivotally secured intermediate thereof to said lugs, substantially as described.

Signed at Montreal, Quebec, Canada, this 25th day of January, 1920.

LINDOR BERGERON.

Witnesses:
C. PATENAUDE,
M. DENYS.